United States Patent [19]

Samreus nee Maymarev

[11] 4,087,679

[45] May 2, 1978

[54] PROGRAMMABLE TIMING DEVICE FOR INDICATING APPOINTMENTS

[76] Inventor: Nikolay Samreus nee Maymarev, Sundbyberg 6, Stockholm, Sweden

[21] Appl. No.: 650,069

[22] Filed: Jan. 19, 1976

Related U.S. Application Data

[63] Continuation-in-part of Ser. No. 380,468, Jul. 18, 1973, Pat. No. 3,934,120.

[30] Foreign Application Priority Data

Feb. 22, 1975 Germany .............................. 2507692

[51] Int. Cl.² .................... G06K 7/06; G06K 19/02; G04C 21/16
[52] U.S. Cl. ...................................... 235/441; 58/19 B
[58] Field of Search ................. 235/61.12 C, 61.12 R, 235/61.11 A, 61.11 C, 61.11 R, 61.6 E, 61.7 B, 61.7 R; 35/48 B; 340/149 A, 149 R; 200/46 R; 58/19 R; 19 A, 19 B; 40/121, 28, 30

[56] References Cited

U.S. PATENT DOCUMENTS

| | | | |
|---|---|---|---|
| 2,124,490 | 7/1938 | Johnson | 58/19 B |
| 2,168,662 | 8/1939 | Babcock | 58/19 B |
| 2,995,691 | 8/1961 | Kennard | 235/61.11 A |
| 3,229,073 | 1/1966 | Macker | 235/61.11 E |
| 3,315,044 | 4/1967 | Newsome | 200/46 R |
| 3,461,276 | 8/1969 | Recca | 235/61.12 R |
| 3,678,251 | 7/1972 | Delpino | 235/61.11 A |

*Primary Examiner*—Robert M. Kilgore
*Attorney, Agent, or Firm*—Kenyon & Kenyon, Reilly, Carr & Chapin

[57] ABSTRACT

A programmable timing device includes a support for receiving markings at locations corresponding with predetermined times in a given period, the locations designated by characters indicating respective hours and predetermined intervals in minutes of the given period, timing means for deriving sequential timing signals at predetermined intervals during the period and means for providing an output signal whenever there is correspondence between a timing signal and a respective one of the markings.

63 Claims, 26 Drawing Figures

Fig. 7
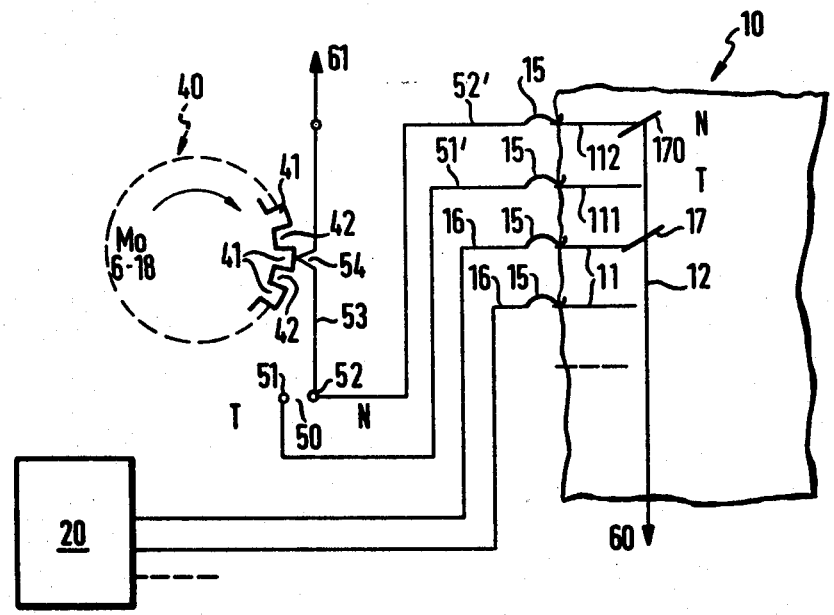
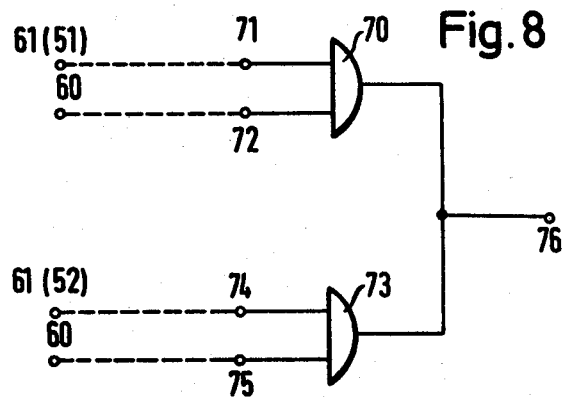
Fig. 8
Fig. 9
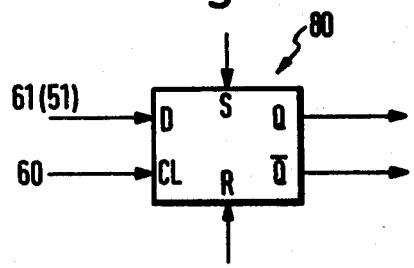

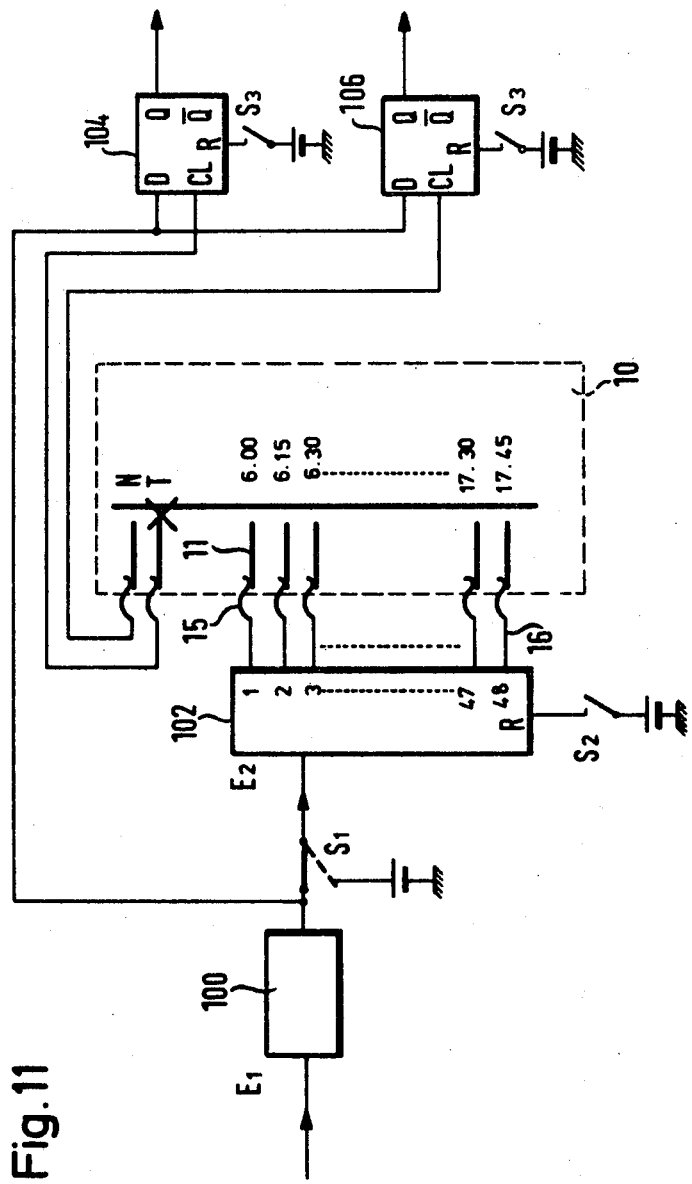

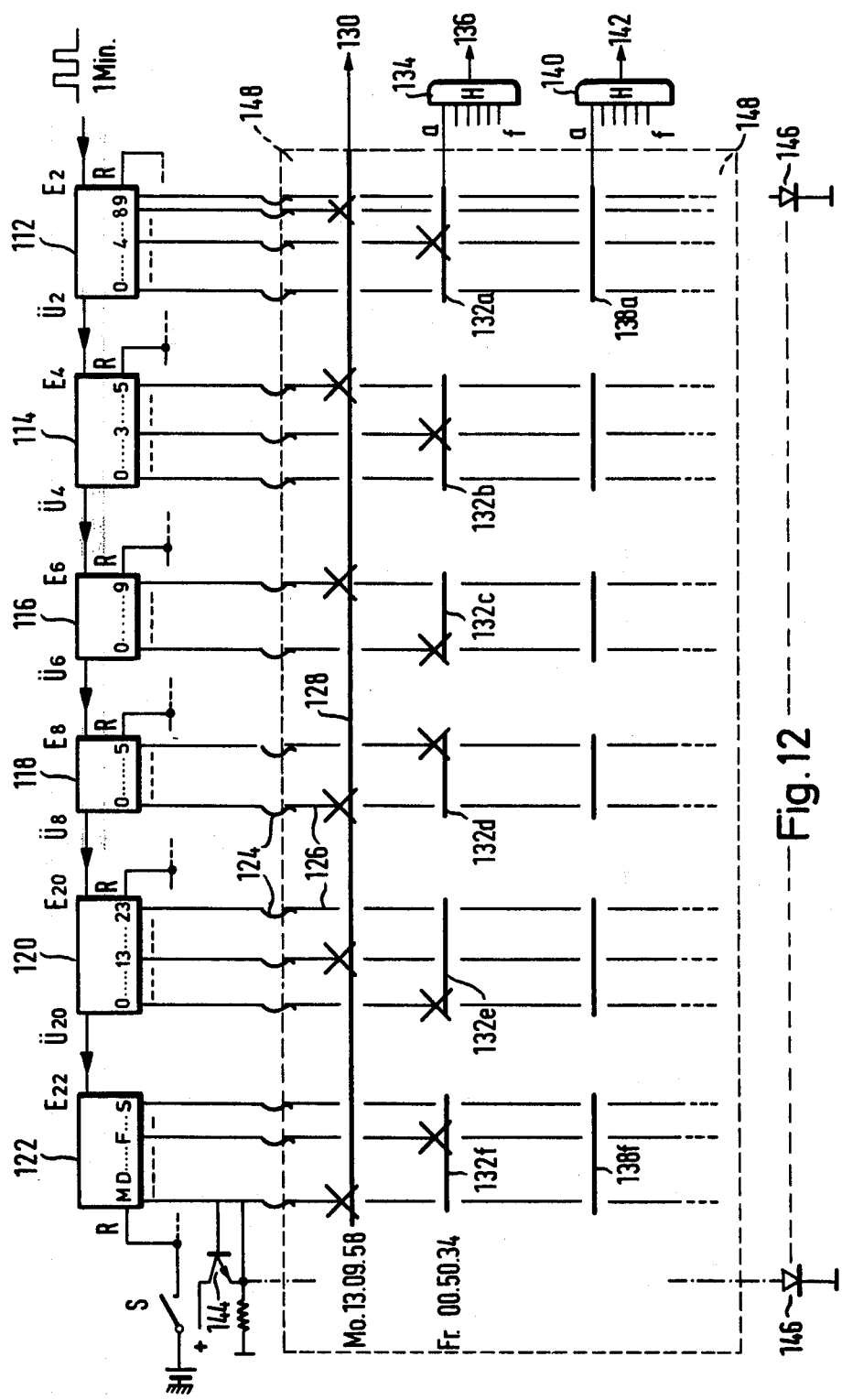

PROGRAMMABLE TIMING DEVICE FOR INDICATING APPOINTMENTS

RELATED APPLICATIONS

This application is a continuation-in-part of application Ser. No. 380,468 filed July 18, 1973, now U.S. Pat. No. 3,934,120 issued Jan. 20, 1976, the disclosure of which is hereby incorporated by reference.

This invention relates to a programmable timing device which can be used to indicate appointments in a perceptible manner, for example, acoustically, visually, or both.

My co-pending application number 380,468, now U.S. Pat. No. 3,934,120 relates to a data storage and retrieval memory device and to a sheet of material adapted for use with said device, said sheet being made of non-conductive material and having conductive paths defining gaps to define storage positions which can be coded by conductive marking material. The embodiments of this invention show how a predetermined time output signal, which can be used for operating an alarm circuit, can be derived from a marking on a support, such as an insertable sheet or a pad provided with conductive paths. They also show modifications and improvements over the invention disclosed in application number 380,468, now U.S. Pat. No. 3,934,120. According to one of these modifications, a predetermined time is recorded in a data storage position to produce coded signals which are compared with timing signals to provide an alarm signal output. According to another modification, predetermined times are entered into a memory by reading markings on a support and the memory is read by sequential timing signals to derive outputs at the predetermined recorded times.

According to the broadest aspect of the invention, a programmable timing device comprises a support for receiving markings at locations corresponding with predetermined times in a given period, said locations being designated by characters which indicate the respective hours and predetermined intervals in minutes of the given period, timing means for deriving sequential timing signals at predetermined intervals during said period and means for deriving a predetermined time output signal whenever any of said timing signals occurs at the predetermined time represented by the respective one of said markings.

Embodiments of the invention will now be described with reference to the accompanying drawings, in which:

FIG. 1 generally illustrates a programmable timing device or signal clock according to the invention;

FIG. 7 illustrates a further embodiment suitable for a twenty four hour time period;

FIG. 8 illustrates a logic stage;

FIG. 9 is a schematic diagram of the logic stage;

Figure 13A:
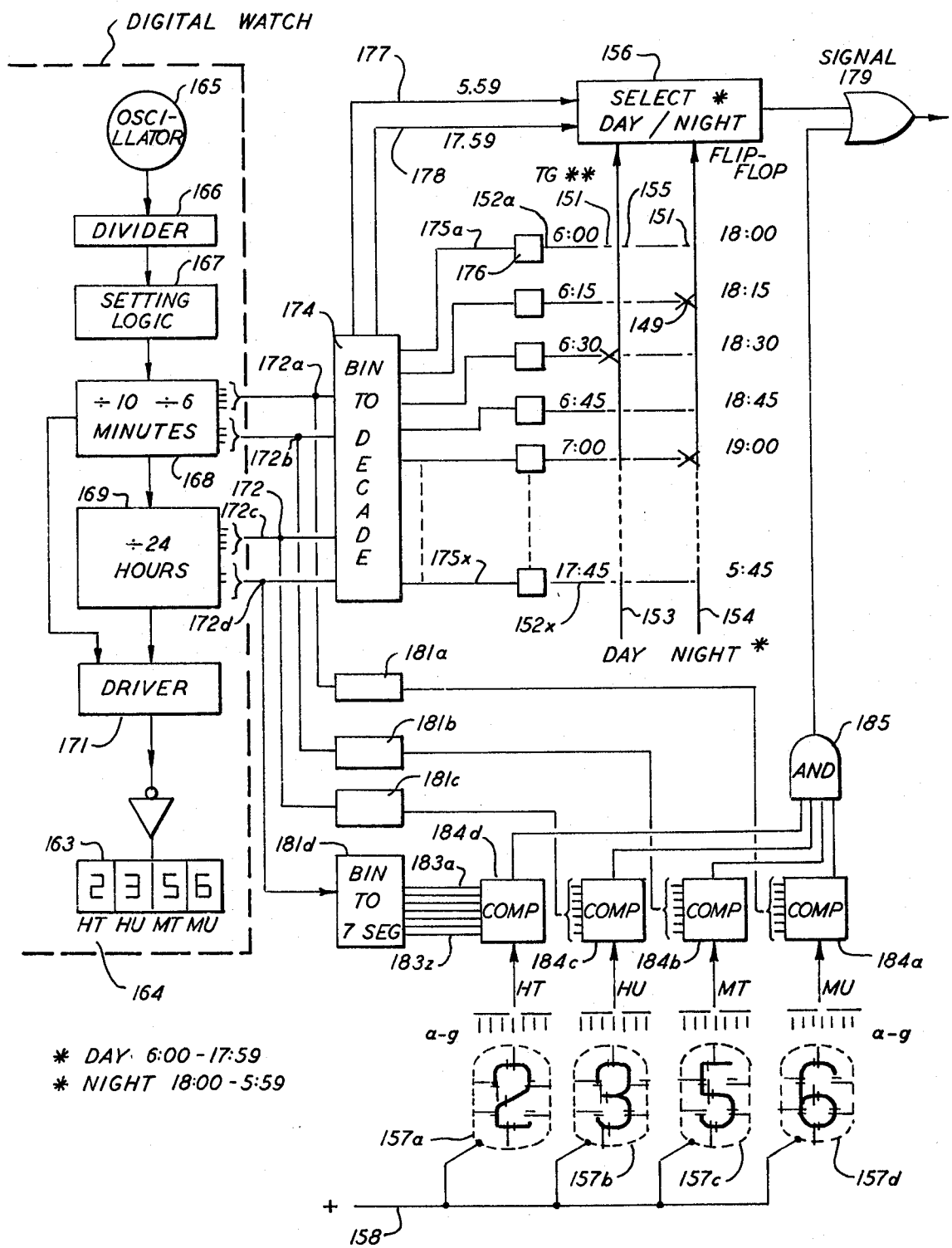
Figure 13B:
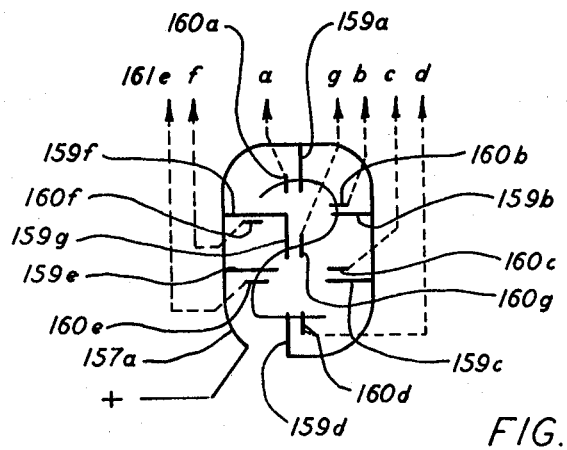
Figure 13C:
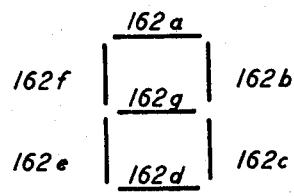
Figure 15:
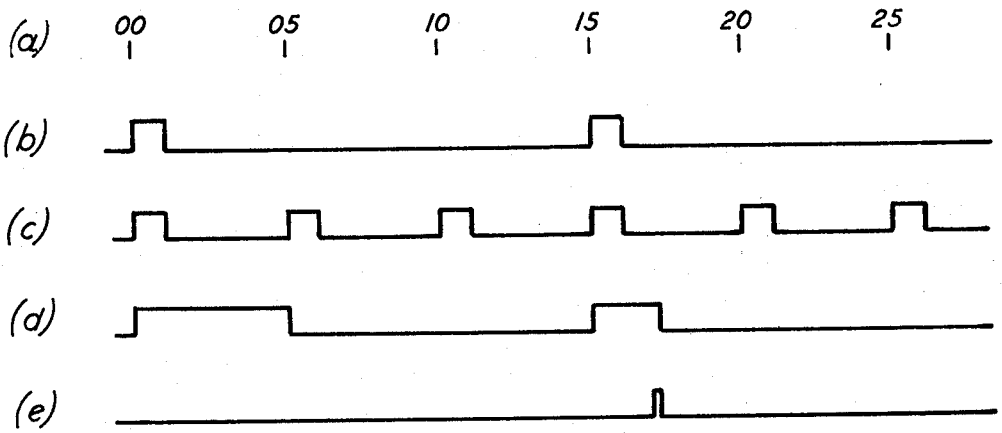
Figure 14:
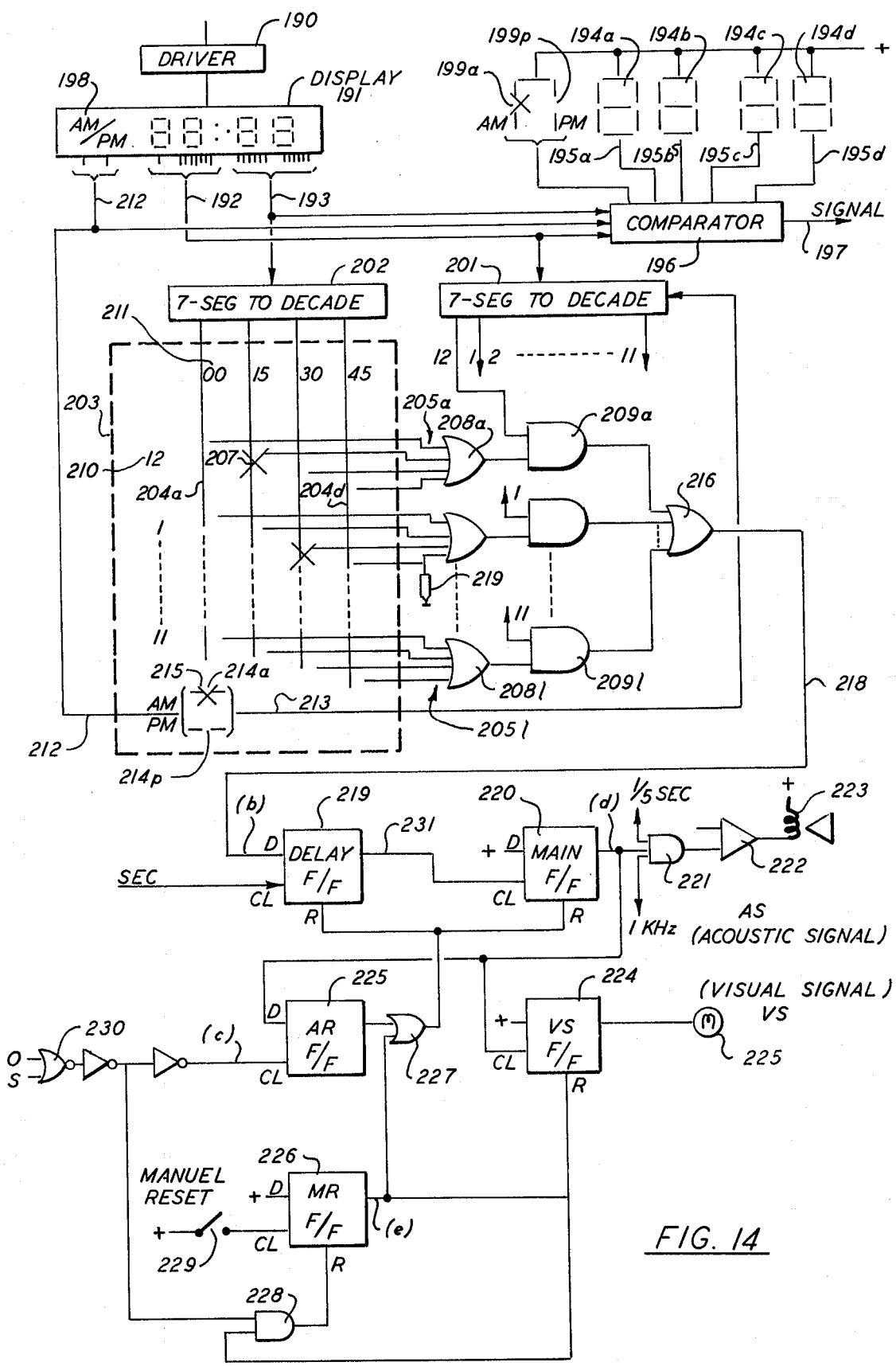
Figure 16:
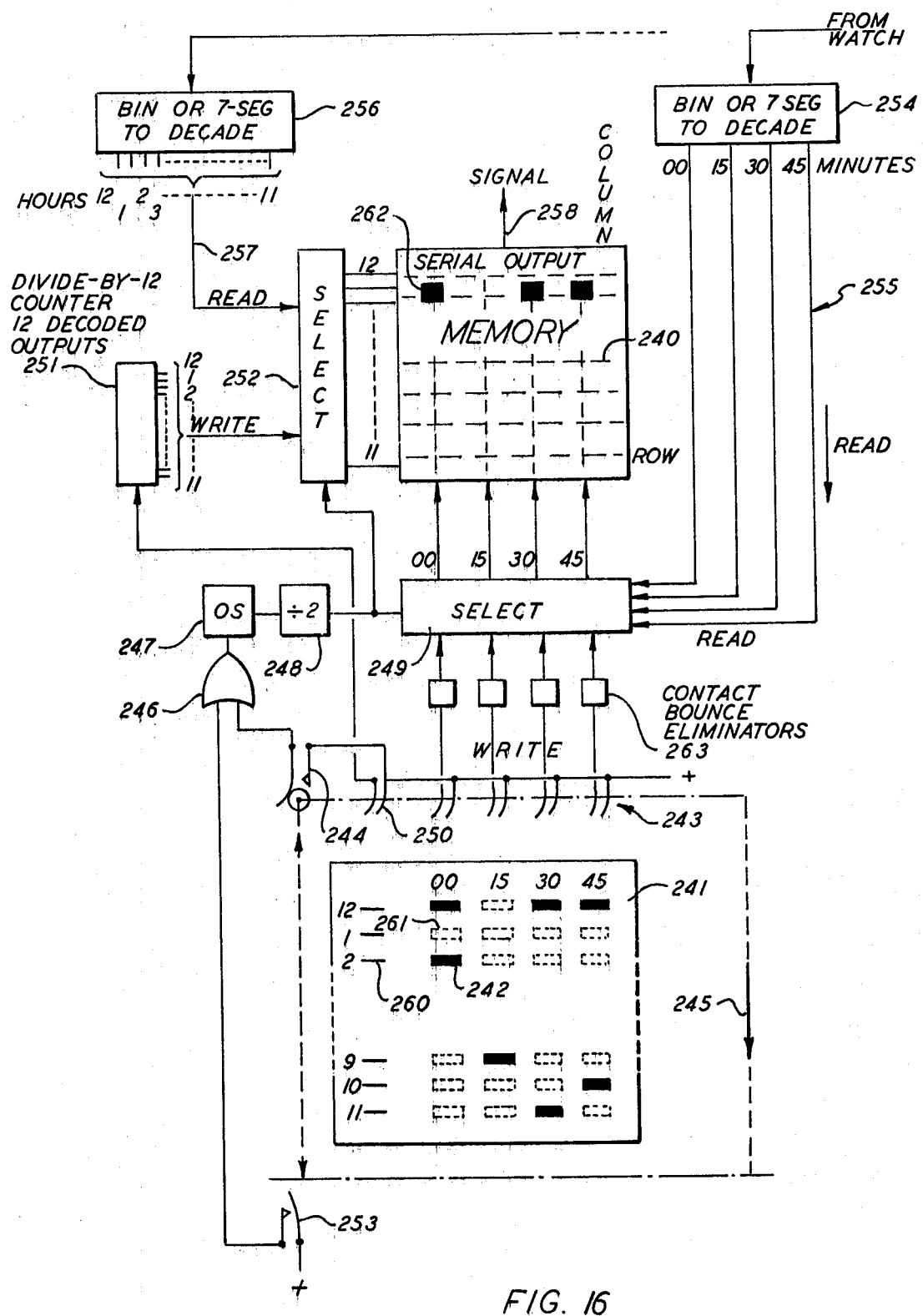

FIG. 11 discloses a further embodiment in which the pulse generator consists of integrated circuits;

FIG. 12 shows a form of construction for seconds programming over a period of one week;

FIGS. 13a to 13c schematically illustrate an embodiment including a digital programming position in which a predetermined time is written in numerals;

FIG. 14 schematically illustrates a modification of the embodiment shown in FIGS. 13a to 13c, which modification includes a preferred alarm circuit;

FIG. 15 is a pulse diagram for explaining the operation of the alarm circuit; and FIG. 16 schematically illustrates an embodiment which employs a memory for recording predetermined times from a reader.

Figure 1:
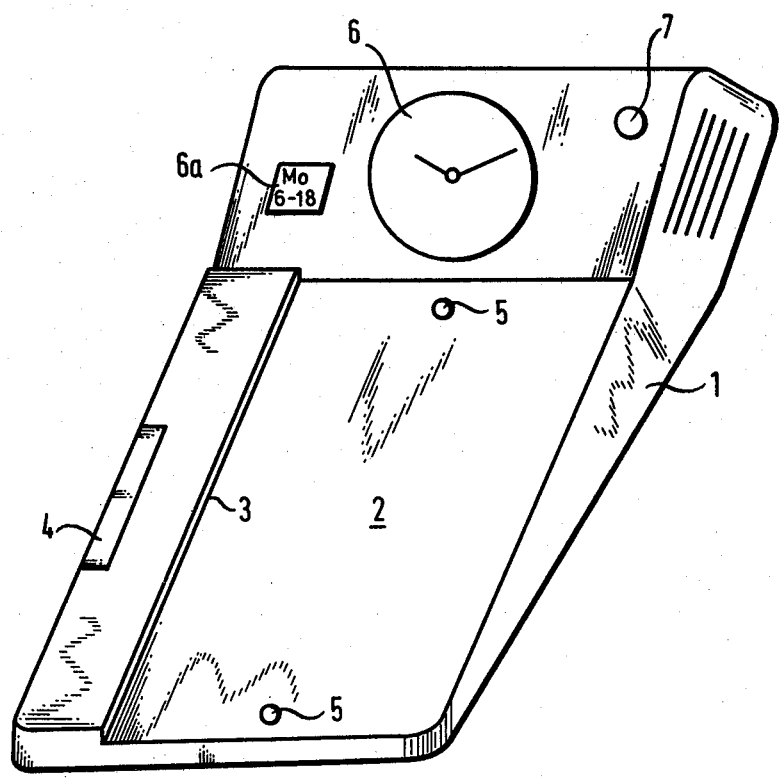
Figure 2:
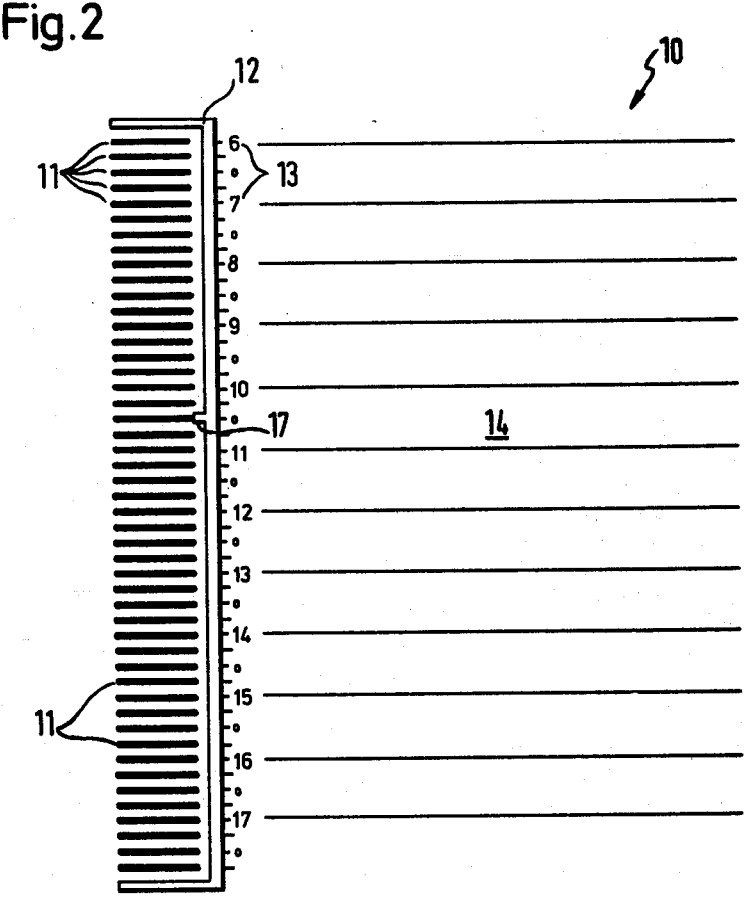
FIG. 2 shows an appointments calendar sheet for use with the device or clock shown in FIG. 1.

As shown in the general illustration in FIG. 1 a programmable timing device or signal clock comprises a casing 1 having a support surface 2 for an appointments calendar sheet 10 (see FIG. 2). A clamping slot 3 can be released by depressing a key 4 so that an appointments calendar sheet can be inserted into this slot and laid down on the support surface 2. In order to ensure correct positioning of the appointments calendar sheet 10, holding pins are provided on the support surface 2. A clock 6 installed in the casing 1 controls the electrical part of the signal clock in a manner which will be described hereinbelow. By means of a push-button switch 7 a signal, which is produced on the occurrence of appointments recorded on the appointments calendar, can be cancelled in a manner likewise to be described hereinbelow.

As shown in FIG. 2, electrically conductive paths 11 are provided on an appointments calendar sheet 10, and are electrically accessible from outside. These paths represent a determined time graduation, for example a time period of 12 hours divided into periods of a quarter-hour each; in order to show these time divisions optically, numerals 13 are recorded on the appointments calendar sheet. In addition, a bus-bar 12 is provided on the appointments calendar sheet 10, while for the purpose of marking a determined moment of time an electrically conductive marking 17 is recorded, which produces a short-circuit between a path 11 and the bus-bar 12. In an area 14 notes can be entered against the respective times to give information regarding the nature of the appointment marked. The base material for an appointments calendar sheet is usually insulating material, for example paper, on which the conductive paths 11 and also the conductive bus 12 are provided.

Figure 3:
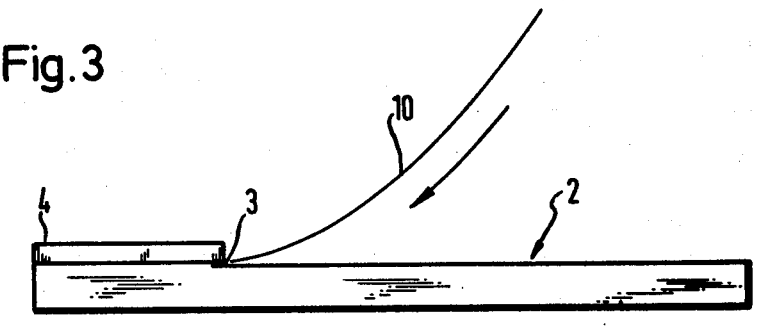
FIG. 3 illustrates diagrammatically how the appointments calendar sheet is inserted.

FIG. 3 shows diagrammatically that an appointments calendar sheet 10, curved in the direction of the arrow shown, can be inserted into the slot 3 and then laid down on the support surface 2.

FIGS. 4a to 4d show various forms of paths and bus-bars and also of the markings producing the signals.

Figure 4A:
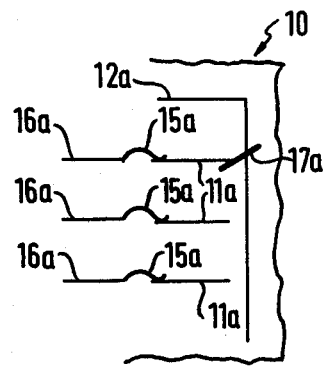
FIGS. 4a to 4k show respective arrangements of conductive paths, bus-bars, markings between the paths and the bus-bars and external connections for the paths on different suports.

According to FIG. 4a, the paths for the time graduation are in the form of parallel linear elements 11a, while the bus-bar 12a runs vertically past their end faces. The external connection of the paths 11a is made by means of fixed contacts 15a, which are situated inside the slot 3 in accordance with FIG. 1 and are firmly pressed on to the paths. From these contacts 15a leads 16a extend to the electrical part of the appointments calendar of the invention; this electrical part will be described later on.

The paths 11a and the bus-bar 12a can be selectively bridged by markings 17a, which can be made by hand, so that an electrical short-circuit is made between the paths and the bus-bar.

Figure 4B:
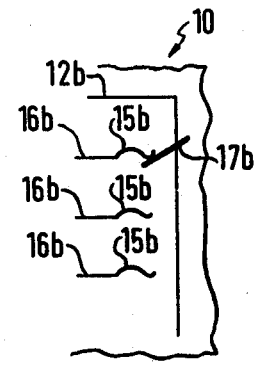

According to FIG. 4b, contacts 15b can be directly pressed against an appointments calendar sheet 10 which has no paths or bus-bar; a bus-bar 12b likewise runs past their end faces. The bus-bar and the contacts 15b are then incorporated in the signal clock. Leads 16b run out direct from these contacts 15b. Here again selective electrical bridging between contacts 15b and the bus-bar 12b can be effected by markings 17b which are electrically conductive and can be made by hand.

Figure 4C:
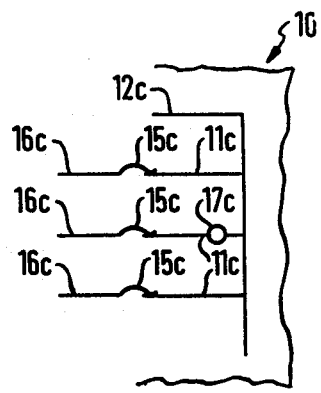

In the embodiment shown in FIG. 4c, paths 11c together with a bus-bar 12c form a comb-like structure, while contacts 15c, from which leads 16c run out, are disposed on the paths 11c. In this embodiment the marking necessary for producing a signal is in the form of holes which are punched in the paths 11c or accomplished by partly erasing the paths.

Figure 4D:
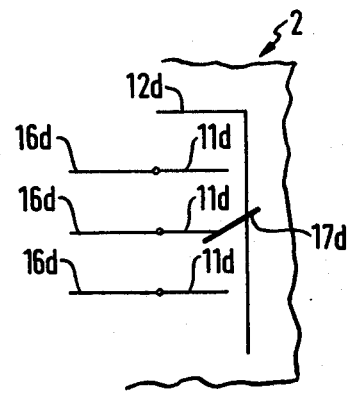
Figure 4E:
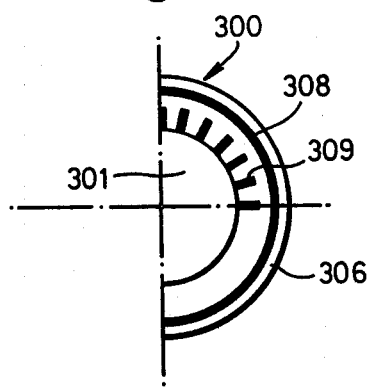
Figure 4F:
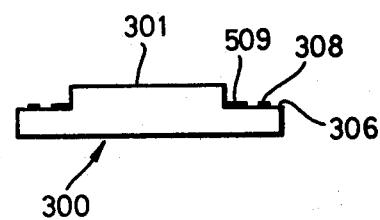
Figure 4G:
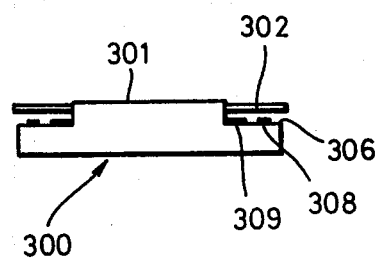
Figure 4H:
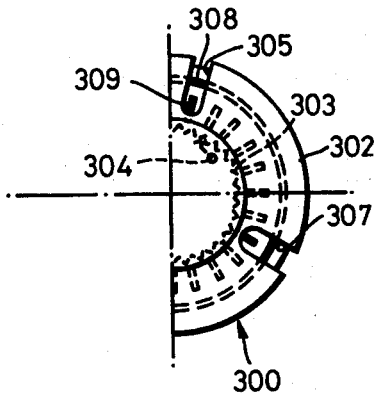

In the embodiment shown in FIG. 4d, paths 11d and a bus-bar 12d, likewise in the form of a comb, are formed directly on a support surface, while leads 16d are fastened to the paths 11d. In this arrangement a signal can be given in the same manner as in the embodiment shown in FIG. 4a, but directly on the support surface 2.

FIGS. 4e-4h illustrate an embodiment which may be used with a wristwatch. The face of a watch 300 includes a transparent cover 301 circumferentially surrounded by a transparent rotatable bezel 302. The inner edge of bezel 302 has teeth 303 which are engaged by a spring arm 304. The pitch of the teeth corresponds with a predetermined timing interval, for example, 15 minute intervals in either a twelve or twenty four hour period depending on the display of the watch. The bezel includes a slot 305 which is wide enough to receive the point of a pencil or some other device for making a marking with conductive material. The marking is made on a rim 306 of the watch casing, which rim has a surface enabling a pencil mark to be made and subsequently erased. At least one other slot 307 is provided in the bezel 302 which is wide enough to receive a small eraser for removing a marking made on the rim 306. A circuit bus-bar 308 and series of conductive paths 309 are provided at radial intervals on the annular surface of the rim 306, the paths being spaced to define a gap which can be connected by conductive marking material.

In use, the bezel 302 is rotated until slot 305 is located at a predetermined time, for example 9.45 a.m. where a marking is made on the surface of the rim 306 closing the gap between a respective conductive path and the bus-bar 308. When the watch indicates 9.45 a.m. an alarm is given. The marking is removed by rotating the bezel 302 until one of the slots 307 is coincident with the marking to enable the use of an eraser.

As an alternative to making a marking on the surface of the rim 306 with a pencil, use can be made of a pressure sensitive layer which optically records a marking and which can be cleared by releasing the marking pressure. Such a device is generally known, per se, and includes a transparent sheet covering a semi-transparent adhesive sheet, such as waxed paper, which overlies a black backing layer. When pressure is applied by a pointed instrument, such as the point of a pencil, the semi-transparent sheet adheres to the backing layer making the marking visible. The marking is erased by separating the semi-transparent layer from the backing sheet by moving a separating strip between them. Such a device is described in greater detail in the following embodiment.

Figure 4I:
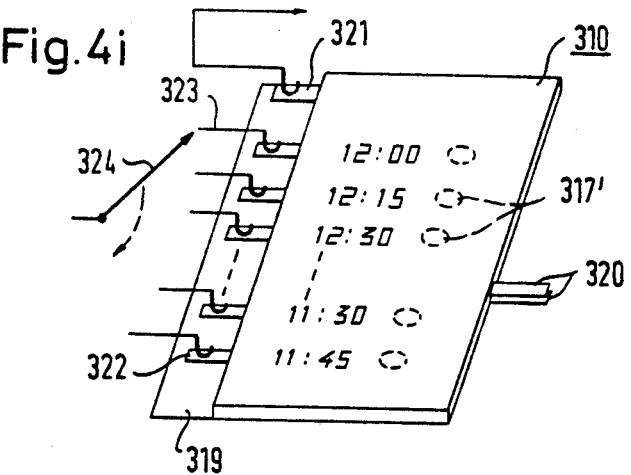
Figure 4J:
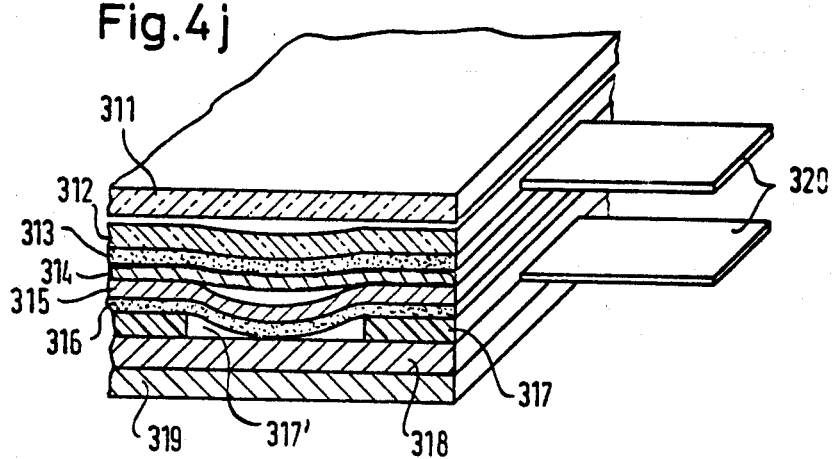
Figure 4K:
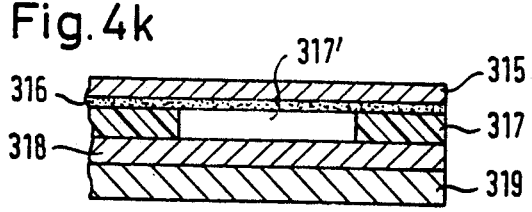

In the embodiment shown in FIGS. 4i-4k, a calendar card 310 is of multi-layered construction as shown in FIG. 4j. These layers include a transparent sheet 311, a semi-transparent sheet 312, an adhesive coating or layer 313, a black base 314, a conductive base 315 (such as a sheet of soft copper), a conductive adhesive layer or coating 316, an insulating sheet 317 with a plurality of holes 317', a layer 318 including conductive paths and a base 319. A pair of separator strips 320 are provided between sheet 312 and the adhesive layer 313 and between the layer 318 including conductive paths and the insulating sheet 317. The separator strips extend across a column of holes 317' shown in dotted lines in FIG. 4i.

Card 310 is marked in predetermined time intervals (12.00, 12.15, 12.30 . . . 11.30, 11.45 as shown), a hole 317' corresponding with each of these markings. When a marking is made with a pointed instrument above one of the holes 317', the marking is made visible by adhesion between the adhesive layer 313 and sheet 312 and a corresponding connection is made between a respective conductive path 318 and the conductive base 315 by contact with the conductive adhesive 316. The conductive base 315 form a bus-bar connected to a pad 321 and the conductive paths 318 are connected to respective pads 322 shown along the edge of the card 310 in FIG. 4g. A series of spring arms 323 contact pads 322 when the card 310 is inserted in the programmable signal clock. Contacts 323 are sequentially connected, as previously described, and as schematically represented by a moving contact 324. The visible markings caused by adhesion between layer 313 and sheet 312 and the contacts made between the conductive base 315, conductive adhesive layer 316 and conductive paths 318 are removed by sliding the separators 320 which releases the respective adhesive contacts. FIG. 4k shows the disconnected state between layers 315, 318.

As an alternative, the layers 315-319 shown in FIG. 4k may be used with a replaceable plain sheet, including a column of marked times and marking locations as shown on card 310, together with spaces for diary entries. In this case, layers 315-319 are provided beneath a support pad for the replaceable sheet, the sheet being secured in the correct position by a clamping device and guides as in the embodiment described with reference to FIG. 2.

In a further alternative, the conductive sheet 315 and conductive adhesive layer 316 are replaced by a sheet containing a series of bistable switching elements, such as diaphragms which can be urged into one of each of two stable positions. Either the diaphragm are conductive or are positioned over a conductive layer which is urged into resilient contact with the conductive paths 318 to make the required contact. Separators 320 may be used to return the diaphragms to a starting position.

Figure 5:
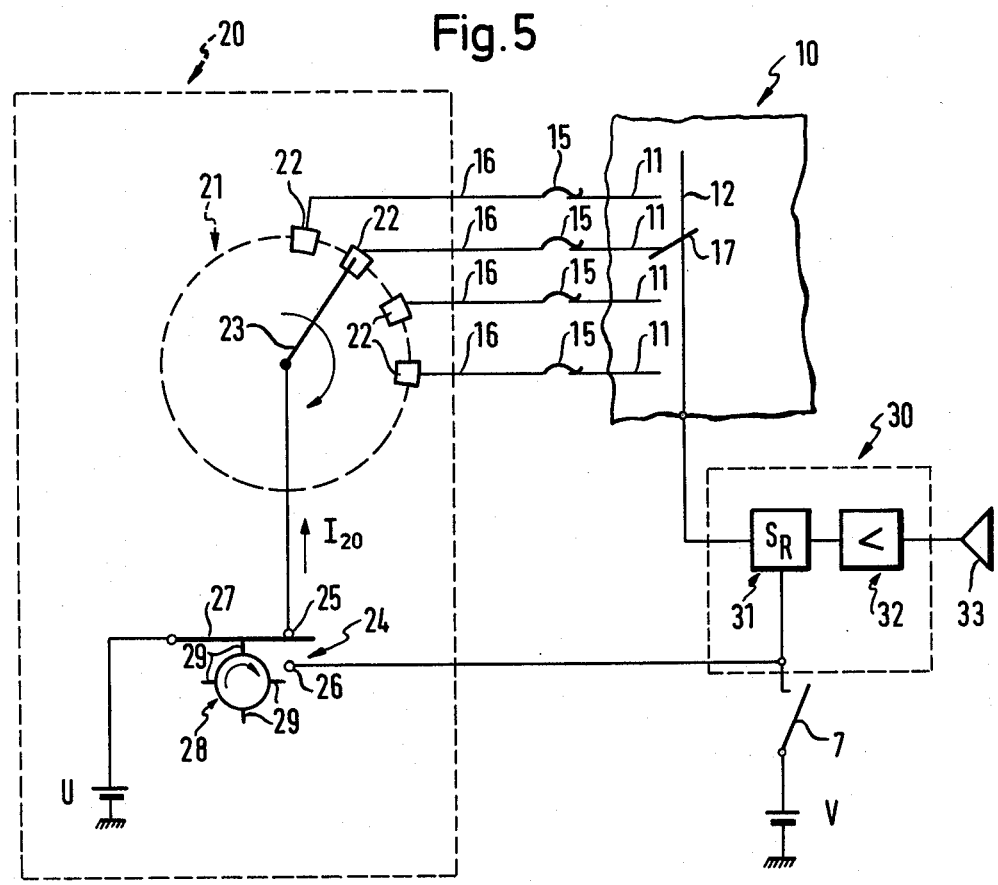
FIG. 5 illustrates the timing means and alarm circuit according to one embodiment.

FIG. 5 shows details of a form of construction of a pulse generator 20 for producing a signal in pulse form, which corresponds to a given time graduation, and also of an output circuit for operating an indicator element.

The pulse generator contains a rotary switch 21, which acts as pulse distributor and which has contacts 22 disposed on a circle and also a rotating contact arm 23 coming successively into electrical contact with the contacts.

The contacts 22 are electrically connected to the paths 11 on an appointments calendar sheet 10 by way of the lead 16 and contact 15 explained in connection with FIGS. 4a to 4d. The number of contacts 22 corresponds to the time graduation provided on the appointments calendar sheet 10. If the time graduation on the appointments calendar sheet 10 as shown in FIG. 2 is equal to a period of twelve hours, for example from 6 a.m. to 6 p.m., each hour being divided into quarter-hours, four contacts 22 will be provided on the rotary switch 21 for each hour, that is to say the rotary switch will have a total of 48 contacts. The contact arm 23 will make one complete revolution in twelve hours, so that it will pass over one contact 22 every quarter-hour.

In addition, the pulse generator 20 contains a change-over switch 24 (= pulse transmitter) which acts as pulse transmitter and has two switch contacts 25 and 26 and also a switch arm 27 adapted to be switched over between these switch contacts. The switch arm 27 is connected to a voltage source U, while the switch contact 25 is connected to the contact arm 23 of the rotary switch 21.

In addition, the switch arm 27 of the change-over switch 24 is operatively connected to a cam disc 28 which is provided with four cams 29 spaced equally apart on its circumference. This cam disc 28 performs one complete revolution every hour. Every time a cam 29 comes into engagement with the switch arm 27 of the change-over switch 24, the latter is connected to the switch contact 25. When a cam 29 runs off the switch arm 27, the latter is switched over to the switch contact 26.

If the rotation of the contact arm 23 of the rotary switch 21 is now synchronised with the rotation of the cam disc 28 in such a manner that the switch arm 27 is connected to the switch contact 25 when the contact arm 23 has run on to a contact 22, the paths 11 on the appointments calendar sheet 10 receive a signal from the voltage source U. This signal is in pulse form, since it begins with the previously mentioned electrical connection through the change-over switch 24 and the rotary switch 21 and ends on the interruption of this connection.

At the point at which a conductive marking 17 on the appointment calendar sheet is situated between a paths 11 and the bus-bar 12, this signal can be transmitted via the bus-bar 12 and passed to the input of the output circuit 30.

This output circuit 30 contains a flip-flop 31 and also an amplifier 33 which is connected to the output of this flip-flop and which operates an indicator element 33. This indicator element is preferably in the form of a sound generator.

When the flip-flop 31 (for example CMOS component 4013) in the output circuit 30 is operated at its S-input by a signal in pulse form from the bus-bar 12, it produces at its output a signal which operates the sound transmitter 33 by way of the amplifier 32. When a cam 29 of the cam disc 28 has run off the switch arm 27 of the change-over switch 24, the switch arm 27 switches over to the switch contact 26. Thus a signal from the voltage source U is applied to this switch contact 26. This signal is transmitted through an R-input to the flip-flop 31, so that the latter is reset, that is to say the signal operating the sound transmitter 33 also disappears.

Figure 6:
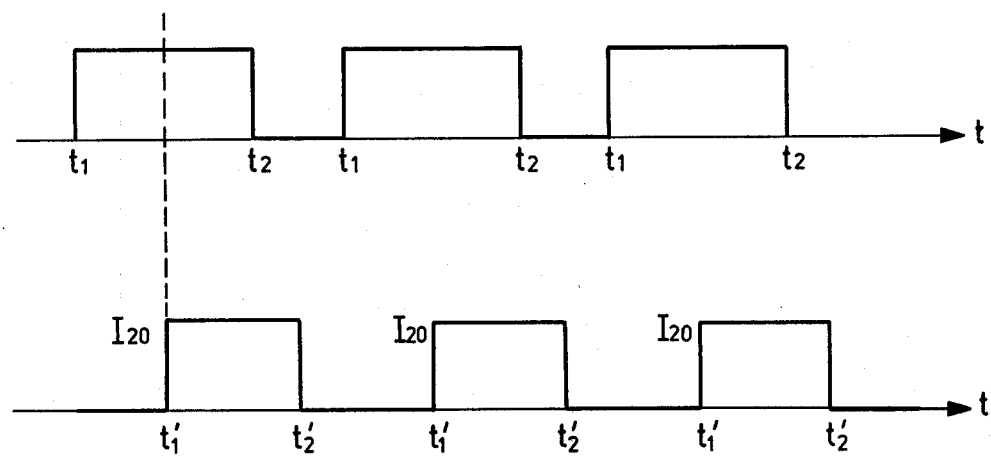
FIG. 6 is a pulse diagram for explaining the embodiment of FIG. 5.

In order to obtain defined indication times the running of the contact arm 23 of the rotary switch 21 is synchronised to that of the cam disc 28 in such a manner that the switch arm 27 of the change-over switch is switched over to the switch contact 25 precisely when the contact arm 23 is situated in the middle of a contact 22. This time sequence can be seen from the time cycle diagrams in FIG. 6 in which $t$ signifies the time. According to the top diagram in FIG. 6, the contact arm 23 runs on to a contact 22 at the moment $t_1$ and runs off it at the moment $t_2$. According to the bottom diagram in FIG. 6, the switch arm 27 of the change-over switch 24 is switched over to the switch contact 25 in the middle between the time points $t_1$ and $t_2$, that is to say at the moment $t_1'$. At each moment of time $t_2'$ a cam 24 has run off the switch arm 27, so that the latter is switched over from the switch contact 25 to the switch contact 26. Electrical pulses $I_{20}$ having a duration of $t_2' - t_1'$ are thus transmitted to the switch contact 22.

By suitable shaping of the cams 29 of the cam disc 28 the duration of the pulses $I_{20}$ can be fixed, so that the sound transmitter 33 also transmits an acoustic signal for a predetermined period of time. This predetermined period of time may for example be within the range from six to twelve minutes.

In order to enable the sound transmitter 33 also to be switched off manually, the reset input R (connected to the switch contact 26) of the flip-flop 31 can be connected by way of a switch 7 to a voltage source V, so that the flip-flop can be reset in order to interrupt the acoustic signals even before a cam 29 runs off the switch arm 27. The switch 7 here corresponds to the push-button switch 7 in FIG. 1.

Instead of a flip-flop 31 in the output circuit 30 according to FIG. 5, a switching transistor, which switches on the sound generator 35 when operated by a signal in pulse form from the bus-bar 12, may for example also be provided.

With an appointments calendar sheet 10 of the kind illustrated in FIG. 2, an appointment indication can be effected within a time period of twelve hours, for example from 6 a.m. to 6 p.m., with the aid of a circuit of the kind shown in FIG. 5. If with an appointments calendar sheet of this kind the indication of appointments is to be extended to a time period of 24 hours, additional action must be taken in order to make it possible to switch over from one period of twelve hours to another period of twelve hours.

The embodiment illustrated in FIG. 7 is suitable for taking this action.

In this embodiment the appointments calendar sheet 10 carries two additional paths 111 and 112, each of which applies to a twelve hour period. It will be assumed that the paths 111 is a daytime paths, for example for the period from 6 a.m. to 6 p.m., and the paths 112 is a nighttime paths, for example for the period from 6 p.m. to 6 a.m. In this arrangement the paths 111 is in particular fixed to the bus-bar 12, while a paths 112 can be conductively connected to the bus-bar by a marking 170. Both paths can also be connected to the bus-bar by their corresponding markings.

These paths 111 and 112 are connected to switch contacts 51 and 52 of a change-over switch 50. This change-over switch is in addition provided with a switch arm 53, which can be switched over between the switch contacts 51 and 52. A cam disc 40 is operatively connected to this switch arm 53 and carries on its periphery cams 41 which are separated from one another by gaps 42. This cam disc 40 makes one complete revolution within a week. The cam disc 40 is adapted to be operated stepwise by a Maltese cross drive (Geneva movement). The cam disc carries inscriptions and displays through a window 6a in FIG. 1 the days and nights of a week. The width of the cams 41 and of the gaps 42 is so selected that a cam 41 and a gap 42 corresponds in each case to a twelve hour period. On the switch arm 53 of the day/night change-over switch 50 is provided a projection 54 which engages the cam 41 on the rotation of the cam disc 40, whereby the switch arm 53 is switched over to the switch contact 52. When a cam 41 runs off the projection 54, the latter passes into a gap 42, so that the switch arm 53 is switched over to the contact 51.

When in the manner illustrated the switch arm 53 lies against the switch contact 52 for the twelve hour night period and when the corresponding paths 112 on the appointments calendar sheet 10 is conductively connected to the bus-bar 12 by the marking 170, an output pulse is transmitted to an output terminal 61 of the switch arm 53 whenever a time graduation paths 11 is connected by a marking 17 to the bus-bar 12. Furthermore, the output pulse is then also applied to a terminal 60 of the bus-bar 12 independently of the day/night change-over switch 50.

The situation is similar when the switch arm 53 of the day/night change-over switch is switched over to the switch contact 51 for a twelve hour day period, since an output pulse then passes from the paths 111 to the terminal 61. The output pulses are transmitted through leads 51', 52' to the switch contacts 51 and 52.

In order now to make it possible to distinguish between the respective two output pulses at the terminal 60 and 61 for the respective twelve/hour period, a logical stage shown in FIG. 5 is inserted upstream of the flip-flop 31 in the output circuit 30 (not shown in FIG. 5). Arrangements for a logical stage of this kind are shown in FIGS. 8 and 9.

In the arrangement shown in FIG. 8 the logical stage contains two AND gates 70 and 73, each of which has two inputs 71, 72 and 74, 75 respectively. The outputs of these two AND gates 70 and 73 are connected in parallel to a terminal 76. One input of each of the two AND gates 70 and 73, namely the input 72 and the input 75, are conjointly connected to the output terminal 60 of the bus-bar 12 in the arrangement shown in FIG. 8. The other two inputs of the AND gates 70 and 73, namely the inputs 71 and 74, are conjointly connected to the output terminal 61 of the switch arm 53 of the day/night change-over switch in the arrangement shown in FIG. 8. In order to indicate in FIG. 9 that the switch arm 53 switches over between the switch contacts 51 and 52, the corresponding reference numerals of these switch contacts are added in brackets at the inputs 71 and 74 of the AND gates 70 and 73.

If the marking 170 for the twelve hour night period is now absent from the appointments calendar sheet 10 according to FIG. 7 and if the switch arm 53 lies against the switch contact 51 for the twelve hour day period, the inputs 71 and 72 of the AND gate 70 will receive a pulse when the pulse generator 20 according to FIG. 7 operates a time graduation mark 11 which is operatively connected by a marking 17 to the bus-bar 12.

The AND gate 70 then switches through, so that this pulse is also applied to the output terminal 76. The acoustic indication of the appointment note is then given in the manner described with reference to FIG. 5.

The situation is similar when the switch arm 53 of the day/night change-over switch has switched over to the switch contact 53 for the twelve hour night period and when the marking 170 for the night period is present. The inputs 74 and 75 of the AND gate 73 then receive a pulse, which is transmitted through this gate to the output terminal 76.

Instead of the AND gates 70 and 73, as shown in FIG. 9, a D-flip-flop known per se may also be used in another embodiment of the invention. An arrangement of a flip-flop of this kind is shown diagrammatically in FIG. 9. A D-flip-flop 80 of this kind has a data input D, a timing input CL, a setting input S, a resetting input R, and outputs Q and Q. The logical value fed in at the data input D is transmitted to the output Q during a timing pulse at the timing input CL. Setting and resetting are effected independently of the timing by signals at the inputs S and R.

In the logical stage for processing the output pulses at the terminals 60 and 61 of the arrangement shown in FIG. 7, two such D-flip-flops are now provided and are operated in the manner described with reference to FIG. 8. In FIG. 9 only the coupling for the switch position in which the switch arm 53 lies against the switch contact 51 within the twelve hour daytime period is shown. The situation is similar for the coupling of the other D-flip-flop (not shown) for the twelve hour night period.

Figure 10:
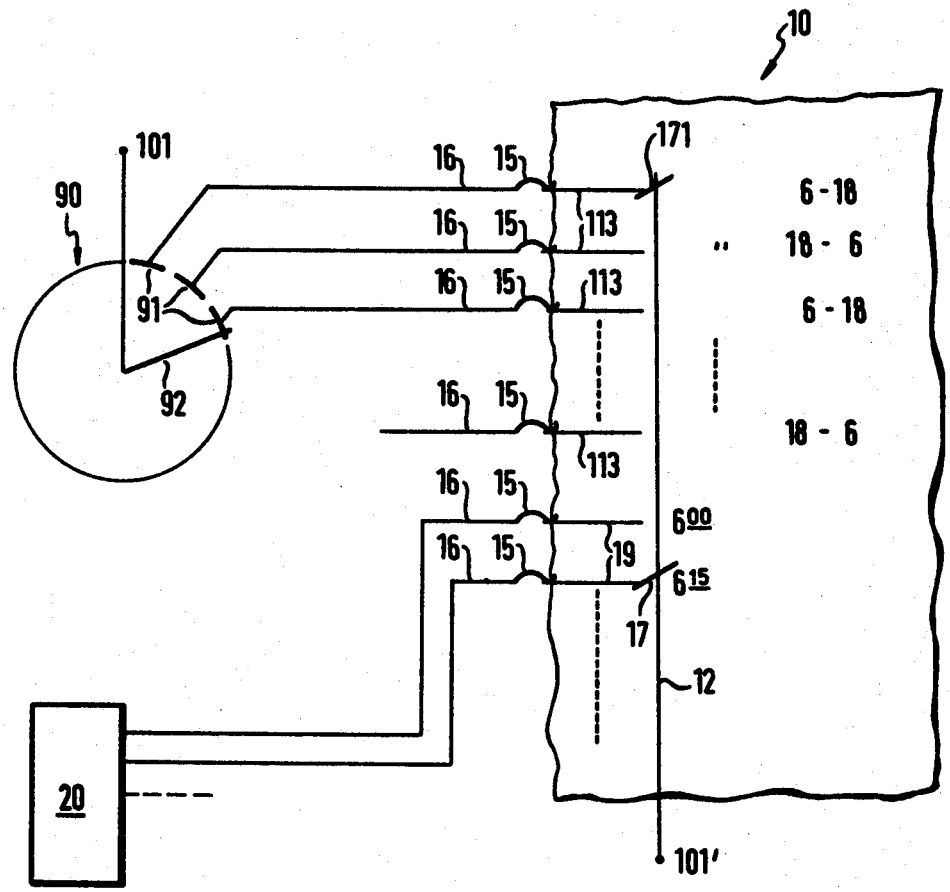
FIG. 10 shows a further embodiment in which appointments on the days of a week can be indicated in respective time periods of 24 hours.

An extension of the arrangement shown in FIG. 7, in which appointments can be indicated acoustically in two twelve-hour periods for each day of a week, is illustrated in FIG. 10. In this embodiment paths 113, each of which represents a twelve-hour period for a day of the week, are provided on an appointments calendar sheet 10 additionally to the time paths 11. These paths 113 are to be selectively connected to the bus-bar 12 by markings 171. For the operation of these paths a contact wheel 90 is provided, which on its periphery carries contacts 91 and a contact arm 92 running over these contacts. The contact arm 92 makes one complete revolution within a week. For each two twelve-hour periods of a day of the week two contacts 91 are here provided, and are coupled by leads 16 and contacts 15 to the paths 113. The contact wheel 90 thus has a total of fourteen contacts for one week. In this arrangement a determined appointment is notified by means of the pulse generator 20, as in the embodiment shown in FIG. 8, while the corresponding pulses can be taken off from a terminal 101 connected to the contact arm 92 and from an output terminal 100 of the bus-bar 12.

In addition to the embodiments described above, it is in general possible within the scope of the invention for time marking pulses to be produced for any desired period of time, for example for years, months, weeks, days, hours, minutes, and seconds, by means of contact wheels of the kind described, in which case paths would have to be provided on appointments calendar sheets for the respective corresponding periods of time.

Furthermore, the pulse generator may consist entirely of integrated circuits (IS).

FIG. 11 illustrates a variant of this kind. The pulse generator consists of a frequency divider 10 and the pulse distributor of a ring counter 102.

The frequency divider 100 divides the one-minute pulses into fifteen-minute timing pulses, which operate the ring counter 102. The ring counter, for example CMOS component 4017, has 48 stages in the form of known bistable flip-flops. For each timing pulse at the input I the H-level is raised by one stage. This gives the following function diagram:

|  | OUTPUTS | | | | |
|---|---|---|---|---|---|
|  | (6.00) | (6.15) | (6.30) | 17.30) | (17.40 |
| 1st timing pulse at 6.00 hours | H | L | L | L | L |
| 2nd timing pulse at 6.15 hours | L | H | L | L | L |
| 3rd timing pulse at 6.30 hours | L | L | H | L | L |
| ...... | | | | | |
| 47th timing pulse at 17.30 hours | L | L | L | H | L |
| 48th timing pulse at 17.45 hours | L | L | L | L | H |

The H-level is passed to the input of a flip-flop 104 and 106 by way of the corresponding marks, markings, and the bus-bar. The flip-flop serves the functions previously described. By means of a switch S2 at the R input the ring counter 102 can be zeroised, while by means of a switch S1 it can be advanced manually. FIG. 12 shows a variant for seconds programming over a period of one week. Six ring counters 112 to 122 are connected in series, the functions of the ring counters are:

| Seconds units | 112 |
|---|---|
| Seconds tens | 114 |
| Minutes units | 116 |
| Minutes tens | 118 |
| Hours | 120 |
| Days | 122 |

The first ring counter 112 is a decimal ring counter having ten outputs (for example CMOS 4017 type), whose function is to count ten seconds (seconds units). At the input E2 a one-second timing pulse is fed in. It will be assumed that all the ring counters have been reset to zero and have logical positive operation. For each timing pulse at the input E2 the H-level is advanced by one step. After the eleventh second the output O of the ring counter 112 has reached the H-level again and the output U2 (carry out) has supplied a timing pulse at the second ring counter 114. Thus the seconds tens 114 have been advanced by one step, that is to say the output 1 is in the H state. The ring counters are effective only for a timing transition from L to H. The hours counter has 24 steps and the days counter 7 steps. All the ring counters count continuously the corresponding timing pulses week by week. By means of the switch S1 the counters can be reset by way of the R-input, or each ring counter can be reset individually by means of separate switches. Similarly, the counters can be advanced manually by means of S-inputs (not shown) or by the timing pulses. As previously described, all the outputs are connected to the marks either directly or by way of an active element serving as driver. As shown in FIG. 12, the output M of the days counter 122 is connected by way of a transistor 144 to the paths 126. The markings bridge the paths 126 and the bus-bar 128. Six markings make the program: Monday 13.00 hours, 09 minutes, 58 seconds. Only when all the counters come into this state will an H-level occur at the output 130. The bus-bar can be graduated in accordance with the number of counters, as indicated in FIG. 12 by the references 132a to 132f. Each bus-bar is connected to the corresponding input a-f of an AND gate 134. A solution of this kind provides the advantage that a multiplicity of signal time points (on bars 132a-f, 138a-f, etc.) can be programmed on a sheet and the corresponding paths can be connected to the same pulse generator. 130, 136, and 143 are outputs, 148 is the sheet. A light emitting diode 146 (LED), which is connected to the corresponding output of the counter, is used as an optical indicator of the state of the counter or the time. The counter may be a demultiplexer, at the input of which a BCD time signal is fed in.

FIGS. 13 and 14 illustrate embodiments including means for analog and digital programming.

In the embodiments shown in FIGS. 13a-13c, predetermined times are recorded either by making conductive markings 149, or by writing numerals 150 with conductive marking material in prearranged positions, on an insulating support. The markings 149 are made in gaps 151 between conductive paths 152a-152x and corresponding bus bars 153, 154 on the surface of the support. Each conductive path 152a-152x passes below the bus bar 153 and the surface of the insulating support as shown by the broken lines 155.

Bus bars 153, 154 are connected to a day/night selector 156 which selects either bus bar 153 or bus bar 154 in accordance with a day and night period respectively. Each of the conductive paths 152a-152x correspond with predetermined times, for example, separated by intervals of 15 minutes, in accordance with the day or night period selected. In the example shown, the gaps adjacent bus bar 153 correspond with the times from 6.00 a.m. – 17.45 p.m. during the day and the gaps adjacent bus bar 154 correspond with the times 18.00 p.m. – 5.45 a.m. the next day.

Referring to the numerals 150 which are written with conductive material in prearranged positions, each of these positions is defined by the outline of a bus bar 157a-157d. FIB. 13b represents one of these positions. Each of the bus bars 157a-157d is connected to a common lead 158.

Referring to FIG. 13b, a series of conductive paths 159a-159f are connected to bus bar 157a and extend inwardly of the region defined by the bus bar 157a. Path 159f is connected to a path 159g which extends to the centre of the region defined by the bus bar 157a. Alternatively, path 159g can be separate from path 159f but connected to bus bar 157a. Further conductive paths 160a-160g are spaced from and lie adjacent the respective paths 159a-159g. Each path 160a-160g is connected to a respective lead 161a-161g. Each of the leads 161a-161g corresponds with an element 162a-162g of a digital display cell, such as an LED or liquid crystal cell, as illustrated in FIG. 13c. A series of these cells is provided in a display 163 of a digital timing device 164. When, a numeral is written in the position shown in FIG. 13b, contacts are made between certain pairs of the paths 159, 160 for providing an output on line 161a-161g correspond with a 7-segment coded output from the digital display cell shown in FIG. 13c. For example, if the numeral 2 is written in the position shown in FIG. 13b, a connection is made between the paths designated by the characters a, b, g, e and d which will be seen to give the number 2 by tracing the outline of the same characters on the elements of the display cell in FIG. 13c.

The timing unit 164 includes an oscillator 165, a divider 166, setting logic 167, minute and hour dividers 168 and 169 and a driver 171 connected to the display 163. As this timing unit is generally known in the art, no detailed description will be given. However, according to this embodiment, dividers 168 and 169 provide respective binary-coded output signals, corresponding with the numbers shown on the display 163, on multi-wire lines 172a–172d respectively. The signal on line 172a–172d respectively represent the minute units, the minute tens, the hour units and the hour tens. Lines 172a–172d are connected to a binary/decimal decoder 174. Decoder 174 provides outputs on lines 175a–175x, connected to respective paths 152a–152x, at the time intervals marked on the insulating support; in this example 6.00 a.m. – 17.45 p.m. and 18.00 p.m. – 5.45 a.m., at 15 minute intervals. When one of these timing signals corresponds with a predetermined time shown by a marking 149 across a gap 151, an output signal passes along the respective bus bars 153 or 154 to the selector 156. The selector 156 passes this output to an OR-gate 179 if the output corresponds with the correct day or night period which has been selected. The selector may comprise, for example, logical gates or flip-flops which change state automatically in response to suitable signals on lines 177, 178 derived from the decoder 174.

When the decoder 174 includes complimentary metal oxide semi-conductor logic (CMOS), it is necessary to provide transmission gates or three state devices (TREE) 173 due to the logical output levels available with CMOS circuits.

The binary coded signals on lines 172a–172d are also provided as parallel outputs on multi-wire lines 181a–181d to respective binary/7-segment signal decoders 181a–181d. The output of each decoder 181a–181d is comparable with a signal derived from each of the display elements 162 of the respective display cell (exemplified by FIG. 13c) in display 163. The decoder outputs are supplied to respective comparators 184a–184d, each of which may include, for example, a plurality of exclusive OR or NOR (EX-OR or EX-NOR) gates, each gate having one input connected to a respective decoder output and one input connected to a respective line 161a–161g for the corresponding position as shown in FIG. 13b.

Comparators 184a–184d are respectively supplied with 7-segment coded signals from lines 161a–161g for each of the positions defined by the bus bars 157a–157d. When a numeral in one of the display cells of display 163 corresponds with respective numeral 150, the respective comparator 184 provides an output to an AND-gate 185. Thus, at a predetermined time designated by the numerals 150 (23.56 in the example), each comparator 184a–184d produces an output causing coincidence at the input to AND-gate 185. AND-gate 185 is connected to the OR-gate 179 which produces an output when there is no input from the selector 156. The output of OR-gate 179 is provided as a signal which is used, for example, to actuate an alarm circuit (not shown) which provides an audible, or visible alarm or both. A preferred alarm circuit is described with reference to FIG. 14.

In the embodiment shown by FIG. 14 the time signal is decoded directly from the display. The embodiment includes a timing unit (not shown) having a driver 190 connected to a display 191. Display 191 includes a series of display cells which indicate the tens and units of the hours and minutes respectively and which are connected to multi-wire lines 192, 193 to provide corresponding 7-segment coded signals. When the display 191 is of the LCD type, which is AC driven, the AC component must be separated from the 7-segment coded signals, for example, by using EX-OR gates (not shown). An a.m./p.m. display cell 198 is connected to a two-wire line 212. Predetermined times are entered by writing numerals with conductive marking material in each of a series of positions 194a–194d. Each of these positions is provided with conductive paths and bus bars as exemplified by FIG. 13b to supply 7-segment coded signals on lines 195a–195d to a comparator unit 196. Comparator unit 196 is similar in operation to that of the comparators 184 and AND-gate 185 of FIG. 13. Lines 192, 193 from the display 191 are also connected to the comparator unit 196 which produces an output signal when the numerals in the display 191 correspond with the numerals in the positions 194a–194d. The output signals on line 197 is used to operate an alarm circuit (not shown).

This embodiment is adapted for a twelve hour system by provided an a.m./p.m. display cell 198 and by coding with markings at selector gaps 199a and 199p. If the selector 199 is marked in the a.m. mode, the comparator unit 196 produces an output signal on coincidence of a predetermined a.m. time indicated by the display cell 198 and written in the positions 194. An output signal is similarly produced in the p.m. mode.

Lines 213 and lines 192 are connected to a 7-segment/decimal decoder 201. Lines 193 are connected to another 7-segment, decimal decoder 202. Decoder 202 provides a decimally coded output according to a predetermined subdivision of the hour, for example, it has four outputs for the minutes corresponding to 00, 15, 30 and 45 of the display 191. Decoder 201 produces output corresponding with each hour, for example, 1–12, shown on the display 191 for a.m./p.m. respectively.

A matrix 203 includes a series of conductive paths 204a–204d connected to respective outputs of decoder 202. Each of these paths is orthogonal to groups of conductive paths 205a–205L which correspond to the subdivisions of twelve hours. The paths 204, 205 are provided on an insulating support and are thereby insulated from each other. However, the paths define a series of gaps 206 which may be joined by a conductive mark 207 to provide a signal at the input of a respective OR-gate 208a–208L. Each OR-gate 208 is connected to one input of a respective AND-gate 209a–209L. The other input of each AND-gate 209 is connected to a respective output of decoder 201.

The insulating support of the matrix 203 includes a series of characters 210, 211 representing the hours from 1–12 and the minutes 00, 15, 30 and 45 respectively. Thus, the mark 207 represents the time 12.15. The support also includes conductive paths 212, 213 leading to a.m./p.m. selector gaps 214. In the drawing, a mark 215 connects the a.m. gap to designate, for example, 12.15 a.m. with respect to mark 207.

AND-gates 209 are connected to corresponding inputs of an OR-gate 216 having an output connected to line 218.

In operation, when a mark 207 is made on the matrix 203 to represent a predetermined time, and this time is illustrated on display 191, an output is produced on OR-gate 216. This output is supplied on line 218 to an alarm circuit described below.

If one of the gaps 206 is accidentally touched at the correct time, this may cause an output at OR-gate 216. In order to avoid it the inputs of OR-gates 208 may be connected to respective resistors 219 to reduce the sensitivity of the matrix to touch.

The alarm circuit referred to above comprises for example, a plurality of delay or D flip-flops 219, 220, 224, 225 and 226. Flip-flop 219 is connected to flip-flop 220 for operating an acoustic indicator including gate 221, amplifier 222 and loudspeaker 223. Flip-flop 224 is connected to flip-flop 220 for operating a visual indicator 225 if required. Flip-flops 219, 220 and 224 are reset by means comprising flip-flops 225, 226, an OR-gate 227, an AND-gate 228, a manually operated switch 229 and an OR-gate 230.

Flip-flop 219 is clocked at 1 second intervals from the timing unit which drives display 191. When a data input is applied on line 218, the next clock pulse transfers the data to the output line 231 thereby setting flip-flop 219. This arrangement is used to avoid spurious indication if the display 191 is of the LCD type requiring ac operation. The operation of the alarm circuit will be understood from the following description taken in conjunction with timing diagram of FIG. 15.

Referring to FIG. 15:
(a) represents a five minute timing interval on display 191.
(b) represents the output of OR-gate 216 on line 218.
(c) represents the input to flip-flop 225.
(d) represents the output of flip-flop 220.
(e) represents the output of flip-flop 226.

The first pulse (b) at 00 minutes sets flip-flop 219 after a short delay caused by the clock pulse. The output on line 231 sets flip-flop 220 producing a high output at (d). The output at (d) is supplied as one input to an AND-gate 221, the other inputs including a 1 second clock pulse and a 1kH$_z$ signal respectively. This arrangement produces coincidence at 5 second intervals when an output is present on line (d) to cause a varying sound signal from the loudspeaker 223. The high output (d) also sets flip-flop 224 causing the indicator 225 to be lit.

OR-gate 230 receives alternate input signals at 5 minute intervals from the timing unit including display 191. These signals may be derived from the minute unit indication each time a zero or five appears in the display. This produces the pulse output (c) shown in FIG. 15. At time 05 minutes, flip-flop 225 changes state producing an input to OR-gate 227 which resets flip-flops 219, 220. This terminates the first pulse (d) shown in FIG. 15 thereby terminating the sound signal from loudspeaker 223. The visual indicator 225 remains on until it is reset manually by switch 229.

Switch 229 is operated by a biased push button to produce a short pulse causing an output from flip-flop 226 as represented by (e) in FIG. 15. This pulse resets flip-flop 224 extinguishing the indicator 225. If the sound indicator has not been stopped, pulse (e) supplied to OR-gate 227 will reset flip-flops 219, 220 thereby terminating the sound indication. Thus, as soon as a user is aware of an indication of a preset time, switch 229 is closed to stop the indication. After closing switch 229, flip-flop 226 stays in a set state unless there is an output from OR-gate 230, thereby providing a coincident input to AND-gate 228 to reset flip-flop 226. Flip-flop 225 transfers a data input (d) to its output, thereby resetting, when clocked by a zero or five minute signal input (c).

FIG. 16 shows an embodiment which includes a memory 240 for storing data relating to predetermined times entered on a card 241. Characters are printed in the card 241 to represent minute intervals 00, 15, 30, 45 along the upper edge and hour intervals 1–12 along one side. A column of control markings 260 are preprinted with conductive ink, against the respective hour characters. Columns of boxes 261 are preprinted with nonconductive ink, under the respective minute characters. These boxes represent a coordinate system wherein a marking is made in the required box, in the correct column and row, to represent a predetermined time.

The memory 240, which is a so-called "active memory", includes a plurality of bistable cells 262 arranged in a corresponding coordinate system. Various markings 242 shown on card 241 represent these predetermined times. These markings may be made with conductive material when, for example, they are sensed by spaced brushes, or they may just be opaque when boxes 261 are printed with ink for example, green ink which cannot be sensed by a photosensitive device having a low optical response to green light. In the embodiment shown, a series of spaced brushes 243, positioned to correspond with the respective column of hour control markings and the minute markings, are mounted on a support which is moveable over the card 241. Alternatively, means may be provided for moving the card 241 beneath such a support.

A pair of stationary contacts 244 are actuated when the contacts 243 are moved in the direction of arrow 245. This causes an input to an OR-gate 246 which operates a trigger or one-shot circuit 247 which changes the state of a flip-flop 248. The output of flip-flop 248 causes selectors 249 and 252 to be switched into a "write"mode, whereby the data on card 241 is written into memory 240. The control markings representing the hours 12, 1–11 are sensed by brushes 250, which brushes are mounted on the same support as brushes 243. The sensed output is applied to a serial/parallel converter 251, which includes a divide-by-12 counter providing 12 decoded outputs (on a 12 hour system) which are supplied to a selector 252 to address the sensed data to the contact bistable cell 262 in memory 240. Thus, where the brushes 243, 250 are passed over the card 241, data corrsponding with the markings 242 is stored in the corresponding memory cells 262. To avoid errors, a contact bounce eliminator 263 is connected to each of the brushes 243 to ensure that the outputs supplied to selector 240 correspond only with the markings 242. When photosensitive devices replaces brushes 243, the boxes 263 represent amplifiers and triggers pulse generators.

When the contacts 243, 250 have been passed over card 241, a set of contacts 253 are actuated causing flip-flop 248 to change selectors 249, 252 into a "reading"mode. Selector 249 then receives an input from a decoder 254, which is connected to a timing unit. Decoder 254 provides 00, 15, 30 and 45 minute timing signals on lines 255. These signals correspond with the minute on a display of the timing unit. Similarly, decoder 256 is connected to the timing unit to provide a series of 1-12 hour timing signals on a multi-wire line 257 connected to selector 252. Decoders 254, 256 may be 7-segment or binary/decimal decoders depending on the timng unit which is used.

In the "reading mode", selectors 249, 252 enter a reading signal into memory 240 at 15 minute intervals. When there is coincidence between one of these reading signals and data stored in the corresponding bistable cell of memory 240, that cell produces an output signal on line 258. Thus, a serial output is supplied to line 258 corresponding with the programmed times marked on card 241 to operate an alarm circuit such as that described with reference to FIG. 14.

It will be appreciated, when comparing the embodiments of FIGS. 13 and 14 with the embodiment of FIG. 16, that the former employ on-line or real time reading of the programmed information whereas the latter employs off-line reading.

What I claim is:

1. A programmable timing device comprising a support for receiving markings at locations corresponding to predetermined times in a given period, at least one electrically conductive bus bar and a plurality of electrically conductive paths, said markings either making or interrupting an electrical connection between one of said electrically conductive paths and said bus bar, said location being designated by characters which indicate the respective hours and predetermined intervals in minutes of the given period, timing means for deriving sequential timing signals at predetermined intervals during said period and means for deriving a predetermined time output signal whenever of said timing signals occurs at the predetermined time represented by the respective one of said marking.

2. A device according to claim 1 which is in the form of an electronic appointments calendar.

3. A device accring to claim 1 in which said paths and said bus bar are provided on an insulating surface of the device.

4. A device according to claim 1 in which said paths are arranged parallel to one another in a column, the bus bar extending alongside the parallel paths and being spaced from the ends of the paths such that the gaps so formed can be bridged by markings made with conductive material.

5. A device according to claim 1, in the form of a watch said paths and said bus bar being provided on the surface of a peripheral rim of the watch.

6. A device according to claim 5 in which the body of the watch is circular and the body is provided with a rotatable bezel which is coupled to a ratchet, the bezel including a slot for inserting the point of an instrument for making said marking whereby one of the paths is connected to the bus bar.

7. A device according to claim 6 in which the bezel includes another slot for inserting an eraser to remove the marking.

8. A device according to claim 1 in which the bus bar is in the form of a conductive layer which is urged into releasable adhesive contact with a conductive path.

9. A device according to claim 1 in which each marking is made on an insertable sheet over a respective releasable contact.

10. A device according to claim 8 in which each releasable contact comprises a bistable diaphragm.

11. A device according to claim 8 in which the support is made of multi-layered construction including a pressure sensitive layer for visibly indicating the marking, the support including a separator for releasing the contact with the conductive path and for erasing the visible indication.

12. A device according to claim 8 in which the marking is made on an insertable sheet over the respective releasable contact.

13. A device according to claim 1 in which the timing means comprises a shift register which is advanced in time with each predetermined interval.

14. A device according to claim 1 in which the timing means includes:

A rotary switch having contacts which are disposed in a circle and the number of which is equal to a quarter hour graduation within twelve hours, each of said contacts being coupled to a conductive path, said switch having a rotating contact arm which is electrically connected in succession to the contacts and which performs one complete revolution in twelve hours;

A change-over switch having first and second switch contacts and a switch arm which is connected to a voltage source and is adapted to be switched over between said first and second switch contacts, said first switch contact being connected to the contact arm of the rotary switch;

And a rotating cam disc which has four cams spaced equally apart on its periphery and which performs one complete revolution per hour, its cams being disposed in proximity to the changeover switch in such a manner that they successively engage the switch arm of the change-over switch to switch if over once every quarter-hour for a predetermined period of time to said first switch contact thereby successively connecting the contacts of the rotary switch to the respective conductive paths and to the voltage source.

15. A device according to claim 14 in which rotation of the contact arm of the rotary switch and of the cam disc are synchronised in such a manner that the switch arm of the change-over switch is switched over to said first contact when the rotating contact arm is traversing a contact of the rotary switch.

16. A device according to claim 14 in which the predetermined period of time within which the switch arm of the change-over switch is switched over to said first switch contact is determined by the shape of the cams of the cam disc.

17. A device according to claim 16 in which the predetermined period of time is within the range of the period of time that the rotating contact arm is traversing a contact of the rotary switch.

18. A device according to claim 15 wherein the contact arm of the rotary switch is coupled to the shaft of the hours hand of a clock and the cam disc is coupled to the shaft of the minutes hand of the clock.

19. A device according to claim 1 including an alarm circuit for receiving the predetermined time output signal, said alarm circuit including a flip-flop of which one actuating input is coupled to the bus bar, a reset output being coupled to the second switch contact of the change-over switch and its output being coupled to an indicator element; a timing signal on said bus bar setting the flip-flop to transmit an output signal for operating the indicator element, and connection of the voltage source by way of the switch arm of the change-over switch and said second switch contact causing the flip-flop to be reset to isolate the indicator element.

20. A device according to claim 19 in which the flip-flop is adapted to be reset by means of a manually operated contact.

21. A device according to claim 1 in which an output circuit for receiving the predetermined time output signal contains a switching transistor having a control electrode coupled to the bus bar.

22. A device according to claim 1 in which said given period is tewelve hours, and including two additional conductive paths, each being for a twelve hour period, which additional paths can be selectively connected to the bus bar by means of markings, a day/night change-over switch having two switch contacts and a switch arm adapted to be switched over between these contacts, one switch contact of the day/night change-over switch being coupled to one additional conductive path for one twelve hour period and the other switch contact being coupled to the other additional conductive path for the other twelve hour period, a cam disc which makes one complete revolution in a week and which carries on its periphery seven cams spaced apart in the peripheral direction, the width and spacing of these cams being selected such that the width of one cam and of one space corresponds to a day, (twenty-four hours) and that said cam disc is opratively connected to the switch arm of the day/night change-over switch in which a manner that when a cam runs on to said switch arm the latter is switched over to the switch contact for one twelve hour period and when a space between the two cams is adjacent said switch arm, it is switched over to the switch contact for the other twelve hour period.

23. A device according to claim 22 in which a conductive path for a twelve hour period is fastened to the bus bar.

24. A device according to claim 1 in which there are provided, for each day of the week, two conductive paths for each of two twelve hour periods, the device including a contact disc having two contacts for each day of the week on its periphery and a contact arm making one complete revolution per week, and that of the two contacts for each day of the week, one is connected to the conductive path of the corresponding day of the week for one twelve hour period and the other is connected to the conductive path of the corresponding day of the week for the other twelve hour period.

25. A device according to claim 24 including a logical stage comprising two AND-gates, of each of which one input is coupled to the switch arm of the day/night change-over switch or to the contact arm of the contact disc, whilst another input is coupled to the bus bar, the outputs of the AND-gates being conjointly coupled to a flip-flop for actuating an alarm or to a switching ransistor for actuating an indicator.

26. A device according to claim 24 including a logical stage comprising two flip-flops, of each of which one input is coupled to the switch arm of the day/night change-over switch or to the contact arm of the contact disc whilst the other inputs are coupled to the bus bar, the outputs of the flip-flops being conjointly coupled to means for actuating an alarm or to a switching transistor for actuating an indicator.

27. A device according to claim 1 in which the timing means comprises an integrated circuit frequency divider and a ring counter.

28. A device according to claim 27 in which the ring counter can be reset to zero by means of a first switch and can be advanced by means of a second switch.

29. A device according to claim 27 in which for seconds programming over a period of one week, six serially connected ring counters are provided, which respectively represent seconds units, seconds tens, minutes units, minutes tens, hours, and days.

30. A device according to claim 29 in which a plurality of bus bar are subdivided in accordance with the number of ring counters.

31. A device according to claim 29 in which, for a plurality of marking locations, a corresponding number of subdivided bus bars are provided.

32. A device according to claim 31 in which the subdivided bus bars are coupled to AND-gates.

33. A device according to claim 29 in which light emitting diodes are provided for indicating the counting state of the ring counters.

34. A device according claim 1 including numeric recognition means having a series of numeric programming positions, in each of which programming positions, a numeral can be written with conductive marking material, the numerals representing a predetermined time; each of said positions including a plurality of conductors defining gaps which are closed by the conductive marking material for deriving coded signals representing the respective numeral.

35. A device according to claim 34 in which said gaps are disposed at locations corresponding with each indicating element of a numeric display cell.

36. A device according to claim 35 in which each numeric programming position comprises a bus bar in the form of a loop which defines a region in which the numeral is written, a first group of conductive paths connected to said bus bar and directed radially inwardly of said loop, and a second group of conductive paths; each member of said second group of conductive paths being adjacent to, and spaced from, a respective member of the first group of conductive paths to define elongate gaps, said gaps being transverse to the longitudinal dimension of the respective elements of a corresponding 7-segment display cell.

37. A device according to claim 36 in which said timing means includes a digital display having a plurality of 7-segment display cells for indicating the tens and units of hours and minutes in real time.

38. A device according to claim 37 including comparator means for comparing coded signals derived from each display cell with coded signals derived from the respective programming positions whereby the predetermined time output signal is derived when the time indicated by the display corresponds with the time written in numerals in the programming positions.

39. A drive according to claim 34 in which said supports for receiving markings includes at least one bus bar and a plurality of conductive paths which define gaps therewith, said gaps being designated with characters which represent time graduations in said given period; said timing means being operable to derive coded timing signals which are supplied to an addressing circuit connected to each of said conductive paths.

40. A device according to claim 34 including an a.m/p.m. selector whereby the predetermined time output signal is produced only when the markings correspond with preset times in a respective a.m. or p.m. period.

41. A device according to claim 40 wherein the selector comprises conductive paths defining gaps respectively representing a.m. and p.m. periods.

42. A device according to claim 41 wherein the timing means includes an a.m./p.m. display cell, said a.m./p.m. display cell and said selector being connected to a comparator for determining either the a.m. or the p.m. period of the predetermined times designated by said markings.

43. A device according to claim 34 wherein said support for receiving the markings includes a matrix of gaps between conductive paths, which gaps are joined by said markings to designate a predetermined time, a first group of the conductive paths designating predetermined intervals in minutes in a one hour period and a second group of said conductive paths designating the hours in a twelve or twenty-four hour period.

44. A device according to claim 43 wherein the timing means includes a display having cells respectively representing the tens and units of the hours and minutes in real time, said first group of conductive paths being connected through a first decoder to the cells representing the tens and units of the minutes in the display, the second group of conductive paths being connected through gating means and a second decoder to the cells representing the tens and units of the hours in the display, said gating means being enabled by coincidence between a signal from the first decoder, which signal is conducted by a conductive mark in one of said gaps, and a signal from the second decoder, when the display indicates the predetermined time corresponding with said conductive mark.

45. A device according to claim 1 wherein said support is a insertable sheet of insulating material with said conductive paths and at least one bus bar printed thereon.

46. A device according to claim 45 in which said paths and said bus bar are provided in the form of pressure contacts for contacting markings on said sheet, said pressure contacts being formed in a clamping strip for securing said sheet.

47. A device according to claim 45 wherein said marking are made with conductive material on said sheet to make an electrical connection between one of said electrically conductive paths and said at least one bus bar.

48. A device according to claim 45 wherein each of said plurality of conductive paths and said at least one electrically conductive bus bar are electrically connected and wherein said marking comprises a hole punched in a conductive path printed on said sheet to interrupt a conductive path.

49. A device according to claim 45 and further comprising means for clamping said sheet in a predetermined position on a supporting pad, said clamping means including a plurality of contacts for contacting said conductive paths and said bus bar.

50. A device according to claim 49 wherein said marking are made with conductive material on said sheet to make an electrical connection between one of said electrically conductive paths and said at least one bus bar.

51. A device according to claim 49 wherein each of said plurality of conductive paths and said at least one electrically conductive bus bar are electrically connected and wherein said marking comprises a hole punched in a conductive path printed on said sheet to interrupt a conductive path.

52. A programmable timing device comprising a support for receiving marking at locations corresponding with predetermined times in a given period, said location being designated by characters which indicate the respective hours and predetermined intervals in minutes of the given period, timing means for deriving sequential timing signals at predetermined intervals during said period, said timing means including a display having cells representing the tens and units of the hours and minutes respectively, said cells being connected to respective first and second decoders for producing coded timing signals representing each hour and predetermined interval in minutes in one hour period indicated by the display, the device including a reader for reading marking disposed on said support at locations corresponding with said predetermined times, a memory for storing data derived from the reader, and means for entering said coded timing signals into the memory to produce the predetermined time output signal when any one of the coded timing signals corresponds with the predetermined time stored in memory.

53. A device according to claim 52 comprising an electrically conductive bus bar and a plurality of electrically conductive paths, said marking either making or interrupting an electrical connection between one of said paths and said bus bar.

54. A device according to claim 52 in which the reader includes a plurality of sensors which are mounted for relative movement with respect to said support for receiving said markings, said sensors being disposed at locations corresponding with columns of markings representing each hour and the predetermined intervals in minutes in a one hour period.

55. A device according to claim 54 wherein said support includes preprinted control markings representing each hour, which control markings are designated by characters representing said hours, and columns of locations for receiving marking material to record the predetermined intervals in minutes in rows corresponding with the preprinted hour control markings.

56. A device according to claim 54 wherein each sensor is a photosensitive device for sensing opaque markings on said support.

57. A device according to claim 54 wherein the reader includes means for sensing relative movement between said support and the sensors in one direction for deriving a signal to actuate addressing circuits for entering data from the reader into the memory, and means for sensing relative movement between said support and the sensors in the opposite direction to actuate the addressing circuits for entering the coded timing signals into the memory.

58. A device according to claim 52 including an alarm circuit comprising bistable circuit means responsive to the predetermined time output signal for operating an alarm, and resetting means which can be manually operated to reset the bistable circuit means to terminate the alarm.

59. A device according to claim 58 wherein said bistable circuit means includes automatic resetting means responsive to timing signals produced at predetermined minute intervals for terminating the alarm.

60. A device according to claim 59 wherein the automatic setting means comprises a bistable circuit responsive to the output of an OR-gate which is connected to a display cell for indicating minute units, the input to the OR-gate being responsive to coded signals representing different predetermined minute units whereby the alarm is terminated automatically within an interval, in minutes, depending on the difference between said predetermined minute units.

61. A device according to claim 58 in which the alarm comprises a sound signal generator and an AND-gate connected to the sound signal generator, the AND-gate including an input for receiving pulses corresponding with predetermined second units in real time, an input for receiving a pulsating signal at a given frequency and an input for receiving the output signal from the bistable circuit means, whereby the sound signal generator is pulsed at a predetermined frequency to give the alarm.

62. A device according to claim 61 including a visual alarm indicator which is reset by manual operation of the resetting means, the visual alarm remaining energised when the sound alarm is terminated.

63. An electronic appointments calendar comprising a support for receiving markings at locations corresponding with predetermined times in a given period, said markings being visible and conductively connective, said location being designated by characters which indicate the respective hours and predetermined intervals in minutes of the given period, the support being such that, at least in one position on said device, said markings can be updated and are visible prior to automatic scanning thereof, timing means for deriving sequential timing signals at predetermined intervals during said period, means for automatically and sequentially responding to said markings with respect to said sequential timing signals and means for deriving a predetermined alarm output signal only when the respective timing signal occurs at the time represented by the respective one of said markings.

* * * * *